United States Patent
Sparkman

(10) Patent No.: US 6,182,609 B1
(45) Date of Patent: Feb. 6, 2001

(54) RADIO CONTROL BOX FOR BIRD HUNTING

(75) Inventor: Joseph H. Sparkman, Scooba, MS (US)

(73) Assignee: Nothing But Coveys, Inc., Shuqualak, MS (US)

( * ) Notice: Under 35 U.S.C. 154(b), the term of this patent shall be extended for 0 days.

(21) Appl. No.: 09/295,099

(22) Filed: Apr. 21, 1999

(51) Int. Cl.$^7$ .................................................. A01K 1/08
(52) U.S. Cl. ............................................................. 119/427
(58) Field of Search ........................... 119/427; 124/17; 273/108, 317

(56) References Cited

U.S. PATENT DOCUMENTS

| | | | |
|---|---|---|---|
| 154,494 | 8/1874 | Knapp | 119/427 |
| 546,491 | 9/1895 | Maierhofer | 119/427 |
| 654,947 | * 7/1900 | Champlin | 119/427 |
| 2,282,315 | * 5/1942 | Adams | 124/17 |
| 2,642,036 | 6/1953 | Stuart | 119/427 |
| 2,704,050 | * 3/1955 | Stachowski | 119/427 |
| 2,974,954 | * 3/1961 | Martin | 472/54 |
| 3,063,412 | 11/1962 | Colsher et al. | 119/427 |
| 3,080,850 | 3/1963 | Schrougham | 119/427 |
| 3,294,064 | 12/1966 | McKown | 119/427 |
| 3,303,820 | 2/1967 | Boyles | 119/712 |
| 3,310,032 | 3/1967 | Adams | 119/427 |
| 3,357,405 | 12/1967 | Stormon et al. | 119/427 |
| 3,685,491 | 8/1972 | Barrett | 119/427 |
| 4,583,743 | * 4/1986 | Macek | 273/368 |
| 4,909,518 | * 3/1990 | Erlandson et al. | 273/357 |
| 4,995,371 | * 2/1991 | Kuizinas | 124/7 |
| 5,694,913 | * 12/1997 | Parrott | 124/17 |
| 5,983,551 | * 11/1999 | Lalor | 42/105 |

OTHER PUBLICATIONS

"Innotek Accessories" Author, date, and publication data not available.

* cited by examiner

Primary Examiner—Michael J. Carone
Assistant Examiner—Son T. Nguyen
(74) Attorney, Agent, or Firm—Richard C. Litman

(57) ABSTRACT

The present invention relates to a device for the controlled release of a plurality of game birds for hunting. Game birds constrained in the device, are catapulted into the air as if flushed when a remote radio signal is received by an electrically controlled latch mechanism mounted on the device.

9 Claims, 5 Drawing Sheets

RADIO CONTROL BOX FOR BIRD HUNTING

BACKGROUND OF THE INVENTION

1. Field of the Invention

The present invention generally relates to animal release devices. More specifically, the present invention is drawn to a remote controlled device which contains and releases game birds for hunting.

2. Description of the Related Art

Present day game birds are often pen-raised to ensure that an adequate number of birds are available for the ever increasing population of hunters. Pen-raised game birds, however, will not readily flush (fly up) like game birds raised in the wild. Because of this difference, pen-raised game birds must be flushed by a guide and/or hunting dog walking right up on a covey of pen raised game birds. This scenario results in many guides and dogs being accidently shot.

To alleviate this problem, many prior art devices exist which are designed to catapult the game bird(s) upwardly into the air so that the need for the guide or dog is eliminated at the flushing stage of the hunt. Examples of such prior art devices are shown in U.S. Pat. No. 154,494 (Knapp), U.S. Pat. No. 546,491 (Maierhofer), U.S. Pat. No. 2,642,036 (Stuart), U.S. Pat. No. 3,080,850 (Schrougham), and U.S. Pat. No. 3,303,820 (Boyles) The instant devices employ pull cords and the like to release spring driven platforms which propel the game birds into the air.

U.S. Pat. No. 3,063,412 (Colsher et al.), U.S. Pat. No. 3,294,064 (McKown), U.S. Pat. No. 3,310,032 (Adams), and U.S. Pat. No. 3,685,491 (Barrett) show game bird devices in which a solenoid operated latch trips a spring driven door or platform to release the birds. The above devices require extensive electrical wiring for the solenoid.

U.S. Pat. No. 3,357,405 (Stormon et al.) discloses a radio controlled pheasant release device. The instant device requires a relatively complex cage structure to secure a single pheasant.

A device shown in an Innotek advertisement appears to have no restraining latch to securely constrain the birds nor, is there a door opening to efficiently load the birds in the device.

None of the above inventions and patents, taken either singularly or in combination, is seen to disclose a radio controlled bird release device which can efficiently constrain and release a covey of quail or plural pheasants as will subsequently be described and claimed in the instant invention.

SUMMARY OF THE INVENTION

The present invention comprises a structure which propels game birds into the air when the structure receives a radio signal generated by a remote transmitter. The structure includes a housing in which game birds are confined prior to their release. The birds are catapulted into the air via a mesh netting which is utilized to hold the birds in the housing. Plural elastic cords are stretched in a manner to provide the catapulting energy for the mesh netting when the stretching force is removed. A solenoid operated latch mechanism functions to release the stretching force when the solenoid receives a radio signal from a remote transmitter.

Accordingly, it is a principal object of the invention to provide an apparatus which enhances safety for guides and dogs in game bird hunting situations.

It is another object of the invention to provide an apparatus for releasing game birds from an enclosure in response to a radio signal.

It is a further object of the invention to provide an apparatus for releasing game birds, which apparatus will release the game birds in a manner similar to natural game bird flushing.

Still another object of the invention is to provide an apparatus for releasing game birds which is easy to use.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
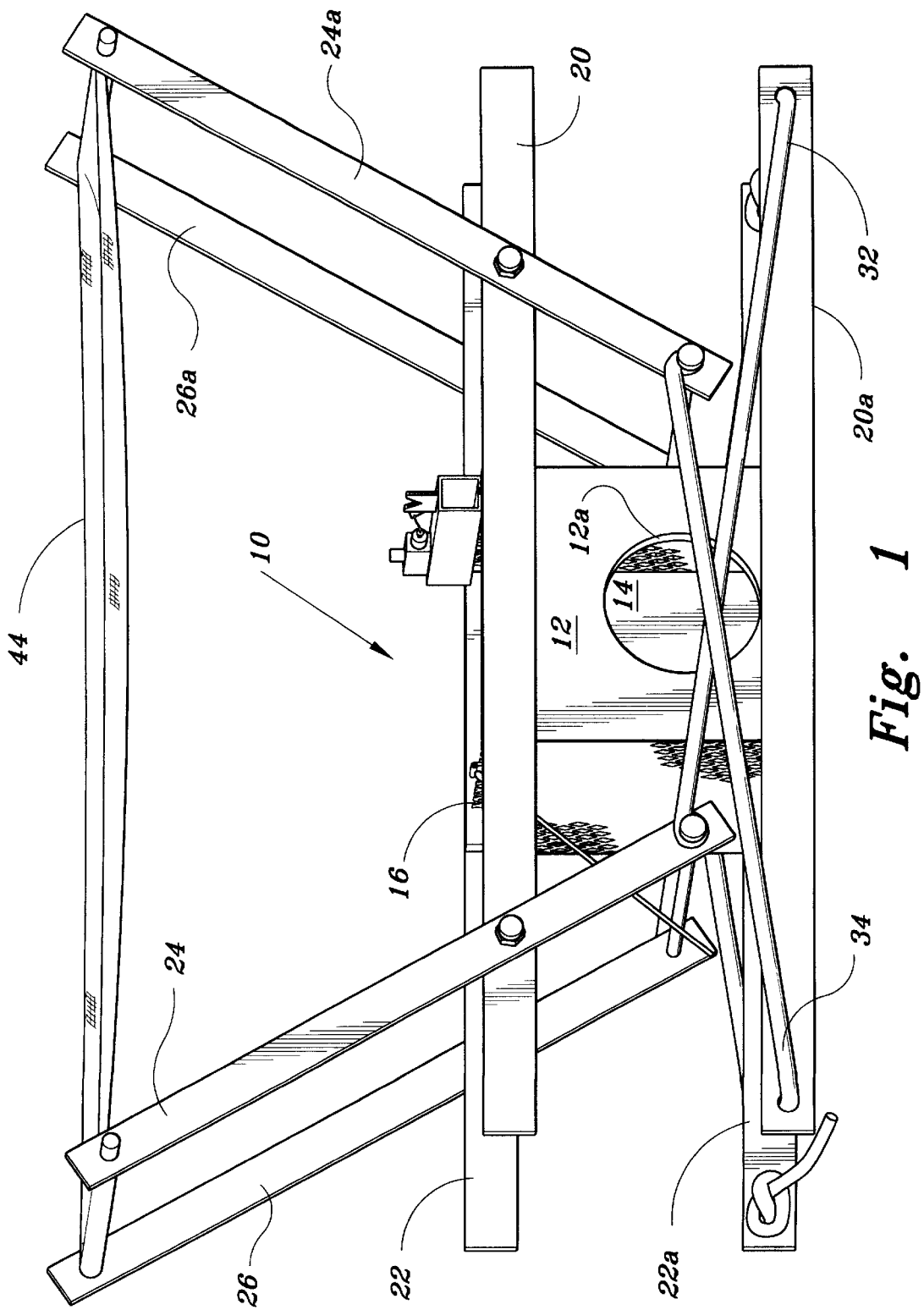
FIG. 1 is an end perspective view of the bird release device in its open position according to the present invention.
Figure 2:
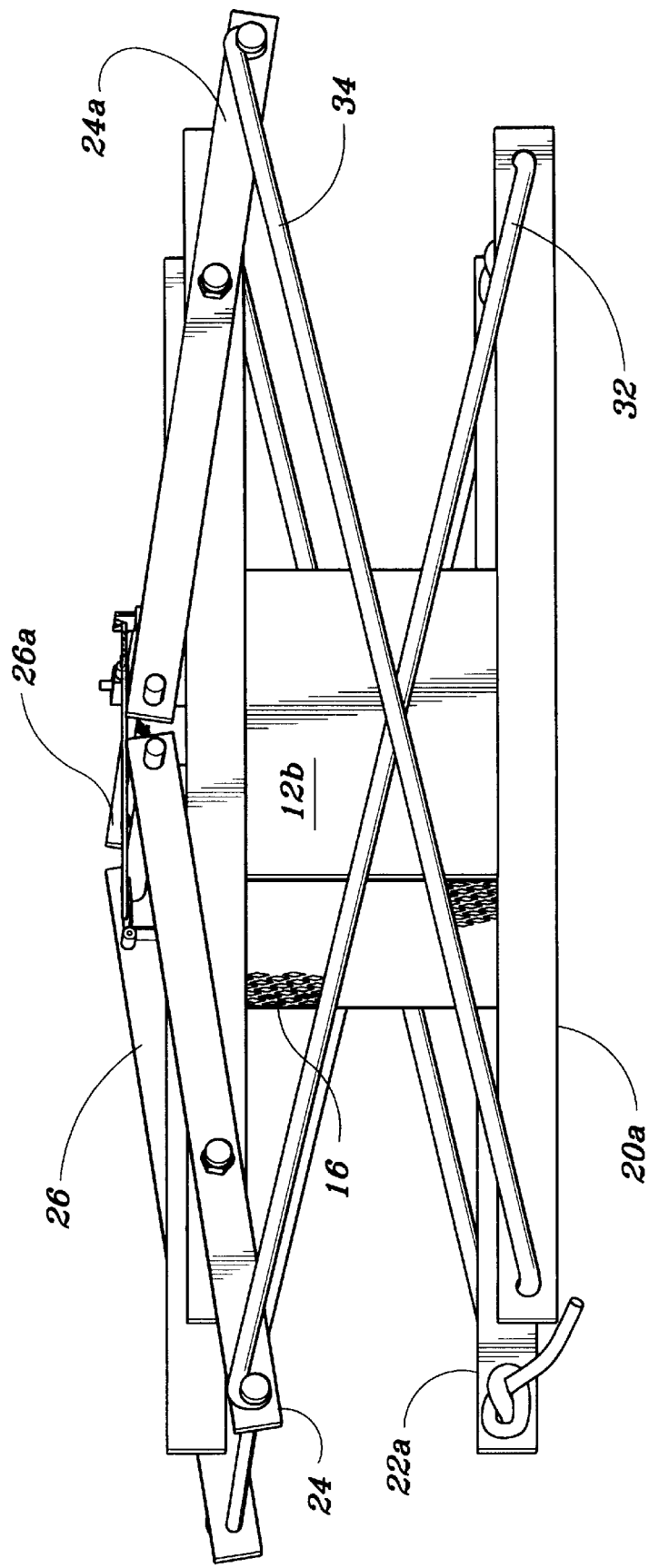
FIG. 2 is an end perspective view of the bird release device in its closed position according to the present invention.
Figure 3:
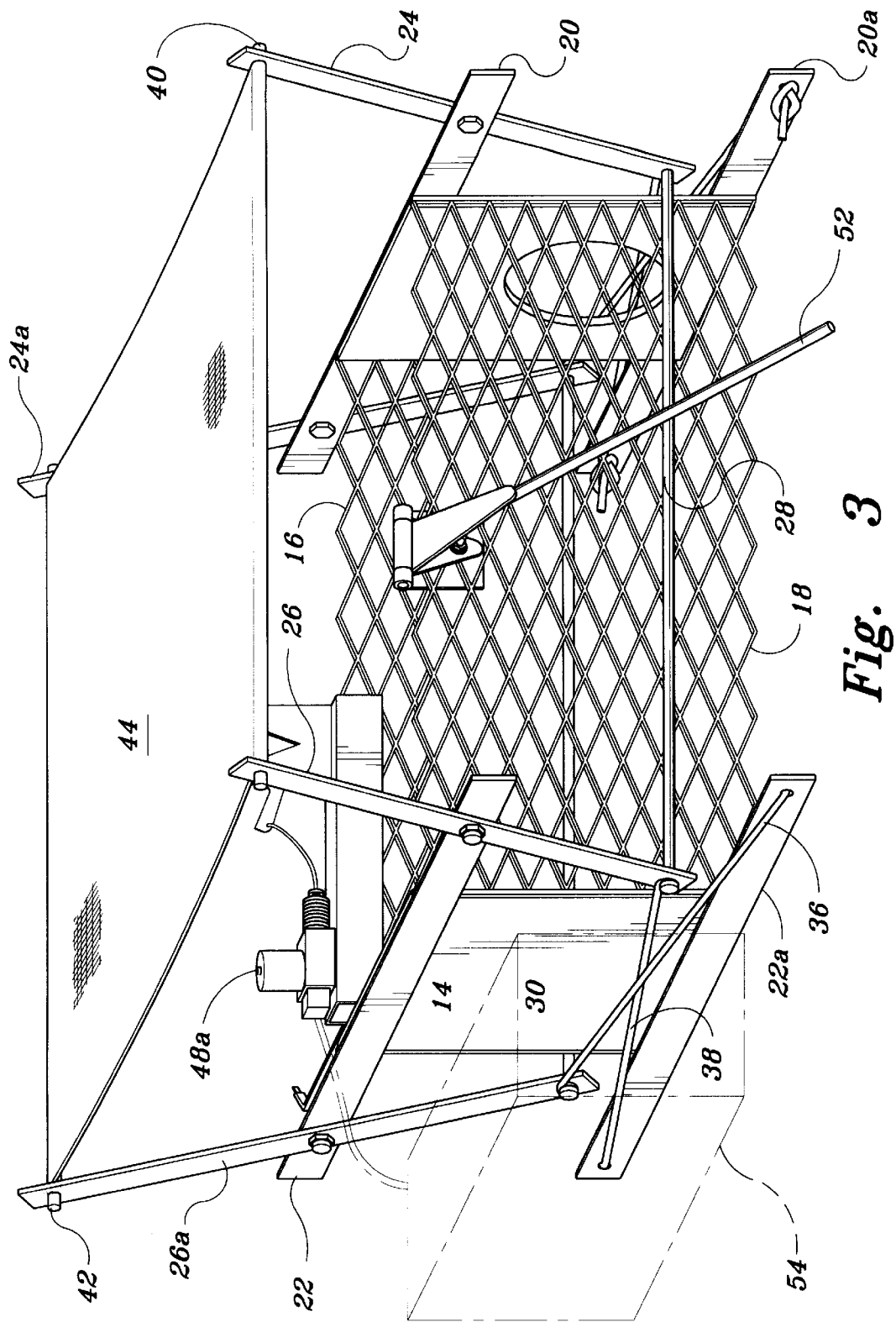
FIG. 3 is a side perspective view of the bird release device in its open position according to the present invention.

As best seen in FIGS. 1–3, the bird release device of the present invention comprises an enclosure generally indicated at 10. Enclosure 10 includes front wall 12, rear wall 14, side walls 16, and bottom wall 18. Front wall 12 has an opening 12a formed therein. Opening 12a is closed by a removable door 12b. Door 12b is supported on wall 12 in a conventional manner. Rear wall 14 has no openings therein. Both front and rear walls are rectangularly shaped and have identical dimensions. The front and rear walls are preferably constructed of wood. However, other materials (metal plastic) may be utilized if desired. Side walls 16 and bottom wall 18 are made of expanded metal. The front wall, side walls, and bottom wall are attached in any convenient manner to form an eight inch by eight inch by sixteen inch open-top enclosure.

As best seen in FIG. 1, flat bars 20 and 20a are attached to and traverse the top and bottom ends of front wall 12. Bars 20 and 20a are three-sixteenths of an inch wide and eighteen inches long. Identical bars 22, 22a are attached to rear wall 14. Bars 20, 20a, 22, and 22a may be constructed of the same material as are walls 12 and 14.

With attention still directed to FIGS. 1–3, bars 24 and 24a are pivotally attached by pivot bolts or the like to the flat bar 20. In similar fashion, bars 26 and 26a are pivotally attached to bar 22. The location of the pivoting axis can be determined by one skilled in the art as will be subsequently explained. Bars 24, 24a, 26, and 26a are each three-sixteenths of an inch wide and fifteen inches long and may be constructed of the same material as are walls 12 and 14. A three-eighths inch diameter rod 28 connects the lower end of bar 24 to the lower end of bar 26. Similarly an identical rod 30 connects the lower ends of bars 24a and 26a. The rods may be attached by any known convenient means (bolts etc.). An elastic cord 32 is fastened at one end to the lower end of bar 24. Elastic cord 32 extends across front wall 12 and is fastened at its other end to an end of bar 20a. In similar fashion, elastic cord 34 is fastened to the lower end of bar 24a and extends across front wall 12 for fastening to the other end of bar 20a. In identical manner, elastic cords 36 and 38 extend across rear wall 14 and are fastened to bars 26, 26a, and 22.

Rods 40 and 42 respectively connect the upper ends of bars 24, 26 and bars 24a, 26a. Rods 40 and 42 are identical to rods 28 and 30. Rods 40 and 42 support the ends of a vinyl mesh netting 44. Netting 44 forms a canopy for the enclosure when the device is in the open position (FIG. 1).

Figure 4:
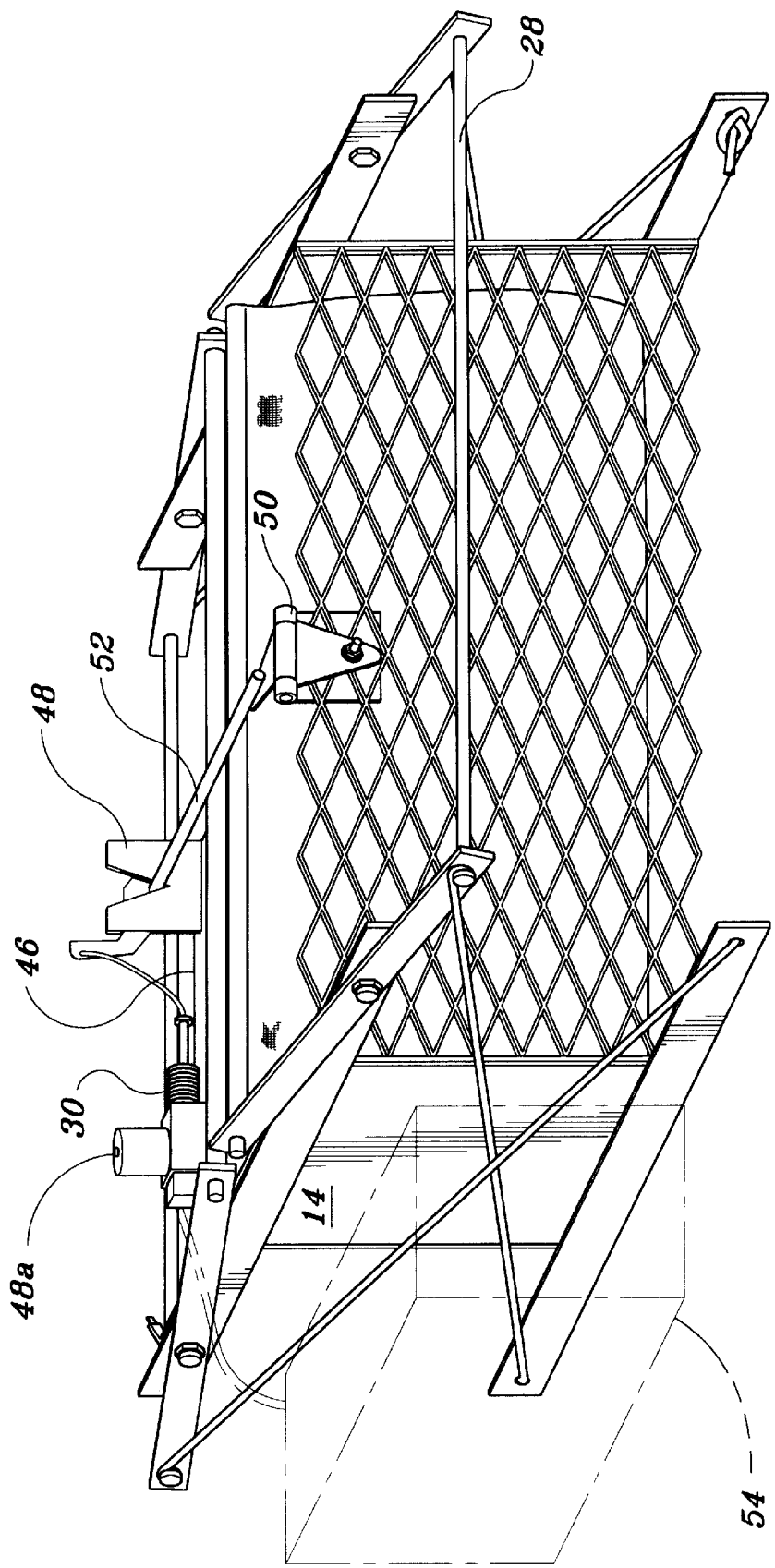
FIG. 4 is a side perspective view of the bird release device in its closed position according to the present invention.

Attention is now directed to FIG. 4 which shows the device in the closed (loaded) position. A metal shelf 46 is secured to one of the expanded metal sidewalls. Shelf 46 supports a solenoid-operated latch mechanism 48 and solenoid 48a thereon. The solenoid and latch mechanism are conventional and are not part of the inventive concept per se. The opposite expanded metal sidewall supports a metal bracket 50. A restraining rod 52 has one end hinged on bracket 50 and a second end adapted to be received in latch mechanism 48. A battery container 54 (shown in phantom lines) is supported in spaced relation to rear wall 14 in any convenient manner. A battery (not shown) is disposed in container 54 for supplying electrical power to operate the latch mechanism.

Figure 5:
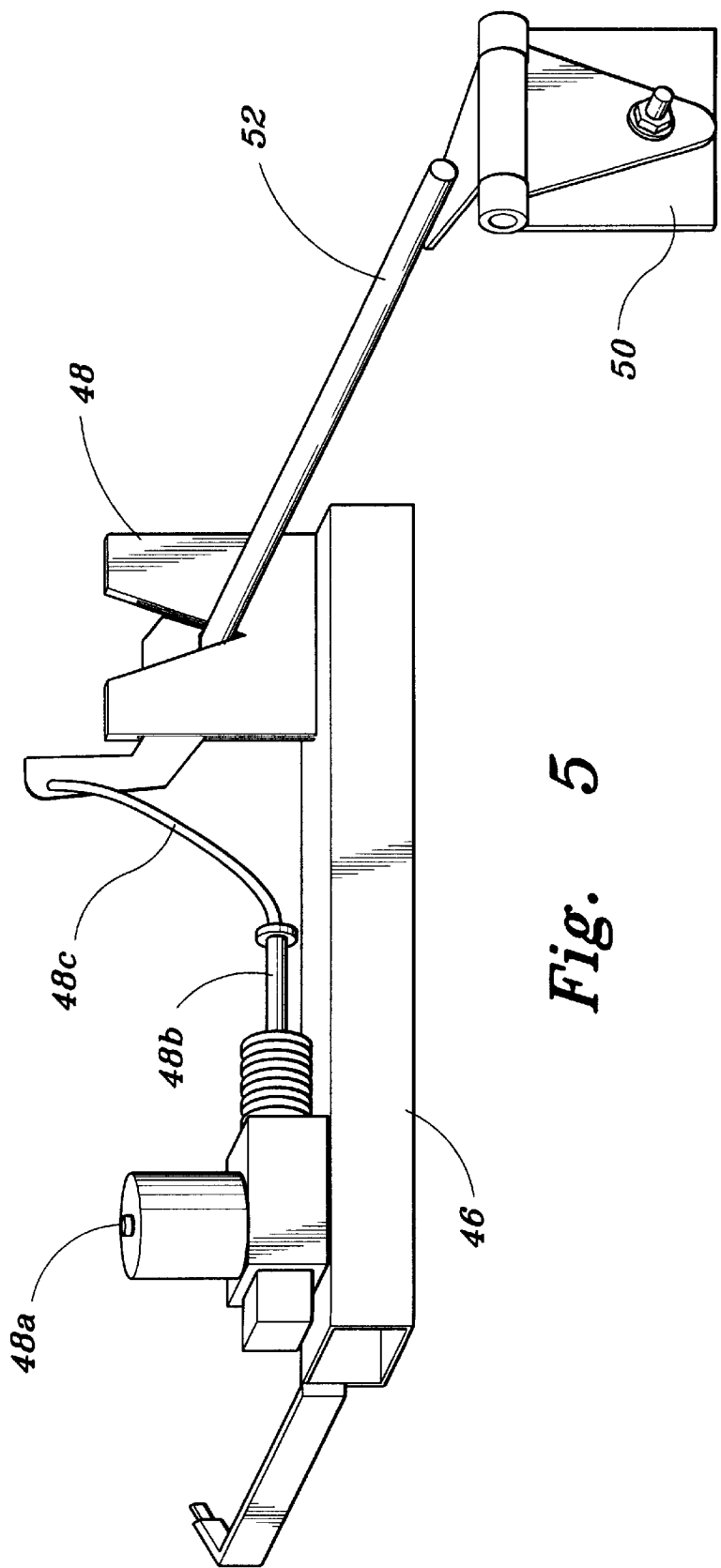
FIG. 5 is a perspective view of the latch mechanism of the bird release device according to the present invention.

With reference to FIG. 5, a detailed view of the latch assembly is shown when in the closed or restraining position. An end of restraining rod 52 is secured by latch mechanism 48. A retractable piston 48b is connected to latch 48 via a pull cord 48c. Operation of the latch assembly will be explained below.

In use, the present invention is initially arranged in the closed position (FIGS. 2 and 4) with the mesh netting 44 disposed within the walls of the enclosure. In the closed position, elastic cords 32, 34, 36, and 38 will be under tension thereby storing energy. Restraining rod 52 is positioned to be held in latch 48 thereby restraining the invention in the closed position. Game birds can now be inserted through opening 12a in front wall 12. Mesh netting 44 will be furled around the game birds. Door 12b is positioned to cover opening 12a thereby ensuring that the game birds will remain in place until released.

Upon receiving a remotely generated radio signal, solenoid 48a will allow electric energy from the battery housed in container 54 to retract piston 48b and pull cord 48c causing latch 48 to release restraining rod 52. The energy stored in the elastic cords will cause pivoting bars 24, 24a, 26, and 26a to pivot and unfurl netting 44 to an open position (FIGS. 1 and 3). The energy imparted to the netting is enough to propel the game birds at least eight feet into the air, thus simulating natural game bird flushing.

It is to be understood that the present invention is no limited to the embodiment described above, but encompasses any an all embodiments within the scope of the following claims.

I claim:

1. A game bird restraining and releasing device comprising:
    a housing, said housing having a front wall, a rear wall, a first side wall, a second side wall, a bottom wall, and an open top;
    an opening in said front wall;
    a door for optionally closing said opening in said front wall;
    a shelf secured to said first side wall;
    a radio signal receiving device mounted on said shelf;
    electrically released latch means mounted on said shelf, said radio signal receiving device connected to said latch means;
    a battery container secured to said rear wall;
    means for restraining a plurality of game birds in said housing; and
    means for catapulting said plurality of game birds from said housing upon reception of a radio signal by said radio signal receiving device.

2. A game bird restraining and releasing device according to claim 1 wherein said first side wall and said second side wall are fabricated from expanded metal.

3. A game bird restraining and releasing device according to claim 1 wherein said radio signal receiving device is a solenoid.

4. A game bird restraining and releasing device according to claim 1 wherein said means for restraining said game birds includes a bracket secured to said second side wall;
    a restraining rod having a first end hinged to said bracket;
    said restraining rod having a second end;
    said latch means engaging and constraining said second end, whereby said receiving device operates to open said latch means and release said second end in response to the radio signal.

5. A game bird restraining and releasing device according to claim 1 wherein said means for catapulting said game birds includes;
    a flexible mesh netting adapted to furl around said game birds in said housing;
    a plurality of pivoting flat bars supported on said housing each bar having a first end and a second end;
    each said first end of said flat bars being attached to said flexible mesh netting;
    spring means for imparting rotational energy to said plurality of pivoting flat bars, whereby said bars pivot to unfurl said mesh netting and to catapult said birds into the air.

6. A game bird restraining and releasing device according to claim 5 wherein said spring means are attached to each said second end of said flat bars.

7. A game bird restraining and releasing device according to claim 6 wherein said spring means are elastic cords.

8. A game bird restraining and releasing device according to claim 7 wherein there are four pivoting flat bars.

9. A game bird restraining and releasing device according to claim 8 wherein there are four elastic cords.

\* \* \* \* \*